United States Patent Office.

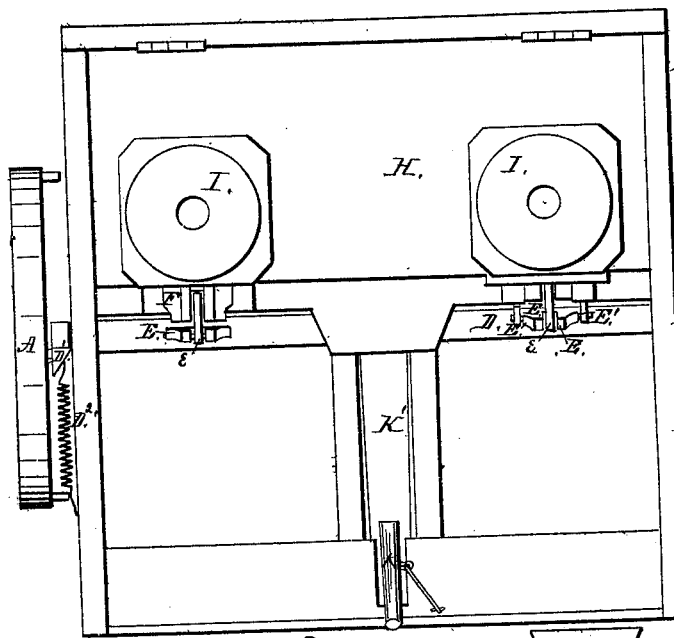
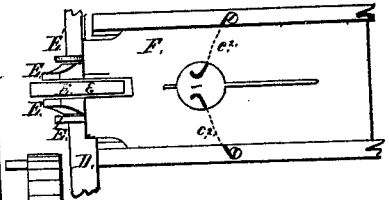
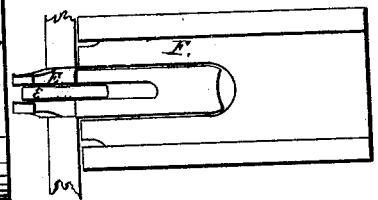
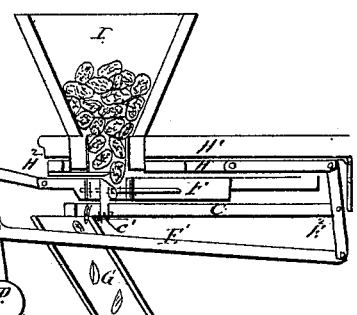
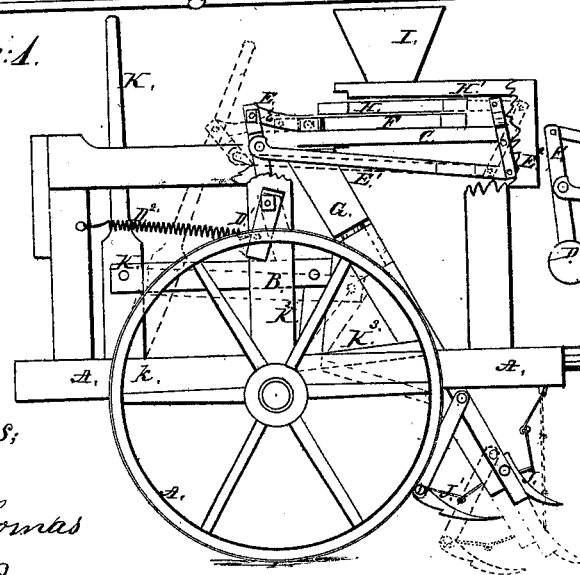

ANDREW J. TAYLOR, OF MANCHESTER, INDIANA.

Letters Patent No. 91,494, dated June 15, 1869.

IMPROVEMENT IN POTATO AND CORN-PLANTER.

The Schedule referred to in these Letters Patent and making part of the same.

*To all whom it may concern:*

Be it known that I, ANDREW J. TAYLOR, of Manchester, in the county of Dearborn, and State of Indiana, have invented new and useful Improvements in Corn and Potato-Planters; and I do hereby declare that the following is a full and exact description of the same, reference being had to the accompanying drawings, and to the letters of reference marked thereon.

This invention consists of an improved machine for planting potatoes, corn, &c., which I designate the "Fenian Hoosier."

Figure 1 represents a side elevation of my improved machine;

Figure 2, a plan view of a slide for planting grain;

Figure 3, a plan view of a slide for planting potatoes; and

Figure 4, a sectional elevation, showing the devices for cutting and dropping potatoes.

The drawings show the machine as adapted for planting two rows at once. It may, of course, be extended, so as to plant any desired number, or be adapted to plant a single row.

In the drawings—

A A represent the main frame of the machine, resting upon the wheels A', from which rise the side-standards B and central standards B', supporting the upper platform C.

The wheels A' are fixed upon their axles, the latter revolving on suitable bearings in the frame.

D represents a shaft, extending transversely across the machine, and resting in suitable bearings in the standards B B', which is provided at its outer end with an arm, D¹, to the lower end of which is attached one end of the coiled spring D², as shown.

E E represent slotted standards, rigidly secured to shaft D, to the upper ends of which are connected the slides F, by means of the bars $e$.

To the shaft D a rocking-motion is communicated by means of projections upon the wheels A', which strike against the arm D¹ of the shaft, and force it to partially revolve in one direction, the return movement being given by the spring D². By this arrangement, the slides F have a reciprocating motion given to them.

The platform C is provided with proper bearings, in which the slides move. It is also cut away beneath the slides, to permit the article to be planted to have proper communication with the tubes G.

In figs. 3 and 4, the machine is shown as arranged for planting potatoes.

E¹ E¹ represent connecting-arms, attached to standards E, which communicate motion to the block E², upon the rock-shaft D.

To the upper end of block E², is connected the slide H, which moves in grooved ways attached to the cover H¹.

The slide H is provided with an opening in the centre, within which the mouth of the hopper I discharges, and across which is placed the knife H².

Upon the platform C, just in rear of the opening which communicates with the conducting-tubes G, is placed the perpendicular knife C¹.

Attached to the ways in which slide F moves, and extending through the centre of the latter, are the springs C², as clearly shown in fig. 3.

The slide is so arranged as to more freely without interfering with the knife C¹ and springs C², being provided with proper slots for that purpose.

For planting corn and other grain, a simple slide is constructed, as shown in fig. 2, which is provided with an opening corresponding in size with the grain to be planted.

J J represent plows, attached to the end of the conducting-tubes G, and in front of their mouths, the office of which is to open the furrow before the seed.

J' J' represent small plows, upon each side, by which the seed is covered. A roller may be used instead of these plows, if desired.

It will be observed that the tubes G are constructed in two parts, by which means they are made extensible, so that they may be made longer or shorter, as may be necessary, according to the nature of the ground. The necessary adjustment is made through the medium of a lever, K, which is pivoted at $k$, and attached to the bar K¹, as shown, the latter of which is fastened to the arms K², attached to the rock-shaft. Upon this rock-shaft are the standards K³, which support the conducting-tubes.

By moving the lever, the tubes can be elevated or depressed, as may be desired.

It will be observed that the wheels are provided, on their circumferences, with pins, which mark the ground as they revolve. These pins, as well as the projection by means of which motion is communicated to the slides F and H, may be made movable, so as to plant more or less rapidly, as may be desired.

From this description, the operation of my machine will be easily understood. If grain is to be planted, a simple slide is used, attached to the standards E, the opening in said slide corresponding with the size of the grain to be planted. If potatoes are to be planted, the slides are arranged as described, and the hopper having been filled, motion is communicated to the machine. The projections upon the wheels striking the arm D¹ of the rock-shaft D, the slides are given a reciprocating motion, the one moving forward, while the other moves backward. The result is that the potatoes, passing from the hopper, are first cut by the knife H²; passing thence into slide F, they are forced by its movement against the perpendicular knife C¹, and again cut. The pieces then fall into the tubes, and are conducted to the furrows.

If desired, the springs C² may be replaced by knives, and the potatoes be again cut.

The machine thus lays off the ground, opens the furrow, cuts, plants, and covers, all at one operation.

Having thus fully described my invention,

What I claim, and desire to secure by Letters Patent of the United States, is—

1. The machine described, consisting of the frame A standards B B', platform C, rock-shaft D, and slides F and H, when combined and arranged as and for the purpose described.

2. The slide F, constructed and arranged as described, in combination with perpendicular knife C¹ and springs C, as described.

3. The above-described arrangement, in combination with slides H, and knife H², and hopper I, substantially as and for the purpose set forth.

This specification signed and witnessed, this 3d day of September, 1868.

ANDREW J. TAYLOR.

Witnesses:
CHARLES ROBINSON,
GEORGE FULCHER.